(12) United States Patent  (10) Patent No.: US 7,099,114 B2
Kang  (45) Date of Patent: Aug. 29, 2006

(54) AIR BEARING SLIDER FOR DISK DRIVE

(75) Inventor: Tae-sik Kang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 261 days.

(21) Appl. No.: 10/753,348

(22) Filed: Jan. 9, 2004

(65) Prior Publication Data
US 2004/0156143 A1 Aug. 12, 2004

(30) Foreign Application Priority Data
Feb. 8, 2003 (KR) .................. 10-2003-0008003

(51) Int. Cl.
G11B 5/60 (2006.01)
(52) U.S. Cl. .................. 360/235.6; 360/235.8; 360/236; 360/236.3
(58) Field of Classification Search .......... 360/235.6, 360/236, 235.8, 236.3
See application file for complete search history.

(56) References Cited

U.S. PATENT DOCUMENTS

| 4,802,042 | A | * | 1/1989 | Strom | 360/236.3 |
| 5,917,679 | A | * | 6/1999 | Park et al. | 360/235.6 |
| 5,940,249 | A |  | 8/1999 | Hendriks |  |
| 6,483,667 | B1 |  | 11/2002 | Berg et al. |  |
| 6,738,227 | B1 | * | 5/2004 | Jang et al. | 360/236.3 |
| 6,809,904 | B1 | * | 10/2004 | Boutaghou et al. | 360/235.8 |
| 6,920,015 | B1 | * | 7/2005 | Mundt et al. | 360/235.6 |
| 2002/0001157 | A1 |  | 1/2002 | Kang et al. |  |
| 2002/0126418 | A1 |  | 9/2002 | Ueno et al. |  |
| 2002/0181153 | A1 |  | 12/2002 | Kang |  |

FOREIGN PATENT DOCUMENTS

EP 458 445 A2 11/1991
JP 11-149732 8/1999

OTHER PUBLICATIONS

Korean Office Action for Application 10-2003-0008003.

* cited by examiner

Primary Examiner—Robert S. Tupper
(74) Attorney, Agent, or Firm—Staas & Halsey LLP

(57) ABSTRACT

An air bearing slider of a disk including a body having a surface facing a disk; a first rail base protruding from the surface facing the disk; a first rail portion protruding from the first rail base, the first rail portion including a cross rail separated from a leading end portion of the first rail base and extending perpendicular to a direction in which air enters, and a pair of side rails respectively extending from both ends of the cross rail parallel to the direction in which air enters; a negative pressure cavity defined by the first rail base; a second rail base protruding from the surface facing the disk; a second rail portion protruding from the second rail base; and an air flow channel disposed between the leading end portion of the first rail base and the cross rail, extending perpendicular to the direction in which air enters.

21 Claims, 7 Drawing Sheets

AIR BEARING SLIDER FOR DISK DRIVE

CROSS-REFERENCE TO RELATED APPLICATIONS

This application claims the priority of Korean Patent Application No. 2003-8003, filed on Feb. 8, 2003 in the Korean Intellectual Property Office, the disclosure of which is incorporated herein in its entirety by reference.

BACKGROUND OF THE INVENTION

1. Field of the Invention

The present invention relates to an air bearing slider of a disk drive, and, more particularly, to an air bearing slider which can improve a take-off characteristic.

2. Description of the Related Art

A disk drive, for example, a hard disk drive (HDD), is an auxiliary memory device of a computer which records data on a disk or reproduces data stored on the disk by using a read/write head.

FIG. 1 is a perspective view illustrating part of a typical hard disk drive. Referring to FIG. 1, a typical hard disk drive includes a magnetic disk (hard disk) 10 which is a recording medium for data recording, a spindle motor 20 rotating the disk 10, a read/write head 31 recording data on the disk 10 or reproducing data stored on the disk 10, and an actuator 30 moving the read/write head 31 to a predetermined position on the disk 10.

The actuator 30 includes an actuator arm 36 rotated by a voice coil motor (not shown), an air bearing slider 32 where the read/write head 31 is mounted, and a suspension 34 installed at one end portion of the actuator arm 36 and supporting the air bearing slider 32 to be elastically biased toward a surface of the disk 10. The air bearing slider 32 having the read/write head 31 is lifted to a predetermined height above the disk 10 to maintain a predetermined gap between the read/write head 31 and the disk 10.

When the rotation of the disk 10 is stopped, the slider 32 is parked in a landing zone 11 provided on a surface of an inner circumferential side of the disk 10. However, as the disk 10 starts to rotate, a lifting force generated due to flow of air applies to a lower surface of the slider 32, that is, an air bearing surface, so that the slider 32 is lifted. The slider 32 is lifted to a height where a lifting force by rotation of the disk 10 and an elastic force by the suspension 34 are balanced. The slider 32 is moved in a lifted state to a data zone 12 of the disk 10 according to rotation of the actuator arm 36. The read/write head 31 mounted on the slider 32 records and reproduces data with respect to the disk 10 while maintaining a predetermined gap with the disk 10, which is rotating.

The air bearing slider discussed above has a variety of structures and, as an example thereof, a basic structure of a conventional TF (taper flat) type air bearing slider is shown in FIG. 2.

Referring to FIG. 2, a TF (taper flat) type air bearing slider 40 has a body 42 having a thin block shape. Two rails 44 extending in a lengthwise direction of the body 42 are formed to a predetermined height on one surface of the body 42, that is, on a surface facing the disk. An inclined surface 46 is formed at a leading end portion of each of the rails 44. In the above structure, when a flow of air is formed in a direction indicated by an arrow A by the rotation of the disk, air is compressed on the inclined surface 46 so that positive pressure is applied to the surface of each of the rails 44. By the positive pressure, a lifting force is generated to lift the slider 40 above the surface of the disk.

In the TF type air bearing slider 40, however, the lifting force gradually increases as the rpm of the disk increases, and accordingly the flying height is gradually increased. The rpm of a disk and the flying height are almost linearly proportional.

In the meantime, an NP (negative pressure) type air bearing slider, which can constantly maintain a flying height by also generating a negative pressure which pulls the slider toward a surface of a disk, has been increasingly adopted. FIG. 3 shows a basic structure of a conventional NP type air bearing slider.

Referring to FIG. 3, two rails 54 extending in a lengthwise direction of a body 52 of an NP type air bearing slider 50 are formed on one surface of the body 52, that is, a surface facing a disk (not shown). A cross rail 58 extending in a widthwise direction of the body 52 is formed between the rails 54. An inclined surface 56 is formed at a leading end portion of each of the rails 54. The cross rail 58 is formed to have the same height as the rails 54. In the above structure, when the flow of air is formed by rotation of the disk in a direction indicated by an arrow A, the two rails 54 generate positive pressure at both side portions of the body 52, and the cross rail 58 generates a negative pressure cavity 59 at the central portion of the body 52. At the initial stage of the disk rotation, since the positive pressure is higher than the negative pressure, the slider 50 is lifted. As the speed of the rotation of a disk increases, the negative pressure gradually increases. When the disk rotation speed reaches a regular rpm, the positive pressure and the negative pressure are balanced so that the slider 50 is not lifted and is maintained at a constant flying height.

Forces acting on the NP type air bearing slider discussed above are described in detail with reference to FIG. 4.

Referring to FIG. 4, when a disk 10 rotates in a direction indicated by an arrow D, flow of air is formed in a direction indicated by an arrow A between the disk 10 and a surface of a slider 60 facing the disk 10, that is, an air bearing surface. Positive pressure is generated by the air flow on a surface of rails 64 protruding from a low surface of the slider 60, that is, on the air bearing surface. Accordingly, lifting forces $F_1$ and $F_2$, lifting the slider 60, are generated. In contrast, negative pressure, or sub-ambient pressure, is generated at a negative pressure cavity 69 of the slider 60 so that a force $F_3$ pulling the slider 60 toward the disk 10 is generated. In the meantime, a gram load force $F_4$ supplied by the suspension (refer to FIG. 1) acts on the slider 60. As a result, the slider 60 is maintained at a height at which the forces $F_1$, $F_2$, and $F_3$, generated by the above-described positive pressure and the negative pressure, and the gram load force $F_4$ are balanced. As the negative pressure increases, the positive pressure must be increased as well in order to make a balanced state. When the positive pressure and the negative pressure increase in a balanced state, the air bearing stiffness of the slider increases so that dynamic stability is improved.

FIGS. 5A through 5D show the procedure of taking-off of the air bearing slider.

Referring to FIG. 5A, when the disk 10 is not rotated, a slider 70 is in contact with a surface of the disk 10, specifically, the landing zone 11 of the disk 10. Reference numeral 13 denotes a bumper protruding on the landing zone 11 of the disk 10 to reduce a contact area between the slider 70 and the disk 10. As shown in FIG. 5B, when the disk 10 starts to rotate in a direction D, positive pressure is formed at a leading end portion of the slider 70 where air enters, so that the leading end portion of the slider 70 is lifted first. Next, as the rotation speed of the disk 10 increases, as shown in FIG. 5C, positive pressure is gradually increased. Accordingly, the slider 70 is further lifted and simultaneously negative pressure is gradually increased. As shown in FIG. 5D, when the rotation speed of the disk 10 reaches a regular rpm, forces acting on the slider 70 are balanced, and accordingly the slider 70 is maintained at a predetermined flying height H.

However, since the conventional air bearing slider is not lifted to a sufficient height until the rotation speed of the disk reaches a regular rpm, a surface of the slider facing the disk, that is, the air bearing surface, contacts the surface or bumper of the disk so that friction may be generated. In this case, the head may be damaged, or debris may be generated which contaminates the disk or head, by which the life span of the head is reduced and performance of the disk drive is deteriorated. Even if the slider and disk are abraded for a very short time, frequent generation of such friction makes the problems serious.

In particular, since a relatively lower flying height has been required recently for the better performance of the head, the performance in the taking-off of the slider should be improved as soon as possible.

SUMMARY OF THE INVENTION

To solve the above and/or other problems, the present invention provides an air bearing slider of a disk drive which can be lifted quickly at a low rotation speed of a disk and minimize a change in the flying height according to a change in the rotation speed of the disk after being lifted.

Additional aspects and/or advantages of the invention will be set forth in part in the description which follows and, in part, will be obvious from the description, or may be learned by practice of the invention.

According to an aspect of the present invention, an air bearing slider of a disk drive moving a read/write head to a desired position on a disk by being lifted from a surface of the disk comprises: a body having a surface facing the disk; a first rail base protruding from the surface facing the disk, wherein the first rail base has a U shape open to a trailing end portion of the body; a first rail portion protruding from the first rail base to generate positive pressure, the first rail portion comprising: a cross rail separated from a leading end portion of the first rail base and extending perpendicular to a direction in which air enters, and a pair of side rails respectively extending from both ends of the cross rail parallel to the direction in which air enters; a negative pressure cavity defined by the first rail base; a second rail base protruding from the surface facing the disk, adjacent to the trailing end portion of the body; a second rail portion protruding from the second rail base to generate positive pressure; and an air flow channel disposed between the leading end portion of the first rail base and the cross rail, formed to a predetermined depth from an upper surface of the first rail base, and extending perpendicular to the direction in which air enters.

A rear inner surface of the air flow channel may be inclined from a center portion toward both end portions of the air flow channel.

The depth of the air flow channel may be the same as the height of the first rail base.

A front end portion of the cross rail may have a sawtoothed shape.

The air bearing slider may further comprise spaces respectively formed in each of the side rails to generate negative pressure, wherein the space is shallower than the negative pressure cavity, separated from the negative pressure cavity, and open to the outside of the respective side rails.

A bottom surface of the each of the spaces may be formed at the same height as the upper surface of the first rail base.

The spaces may be formed in a lengthwise direction of the side rails.

The spaces may be open to the outside of the respective side rails through an open portion of the side rails, and the length of the open portion may be shorter than the length of the respective spaces.

The air bearing slider may further comprise first side indents respectively provided at each of both end portions of the cross rail in a lengthwise direction and extending from the front end portion of the cross rail parallel to the direction in which air enters.

A bottom surface of the first side indents may be at the same height as the upper surface of the first rail base.

The air bearing slider may further comprise second side indents respectively formed at each of both side portions of the first rail base and open to the outside of the first rail base.

The second side indents may be formed along the entire height of the first rail base.

An upper end portion of the second side indents may be disposed in the respective spaces.

Accordingly, the air bearing slider according to the present invention can be rapidly lifted at a low rotation speed of the disk. After the slider is lifted, the change in the flying height of the slider according to a change in the rotation speed of the disk is minimized.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
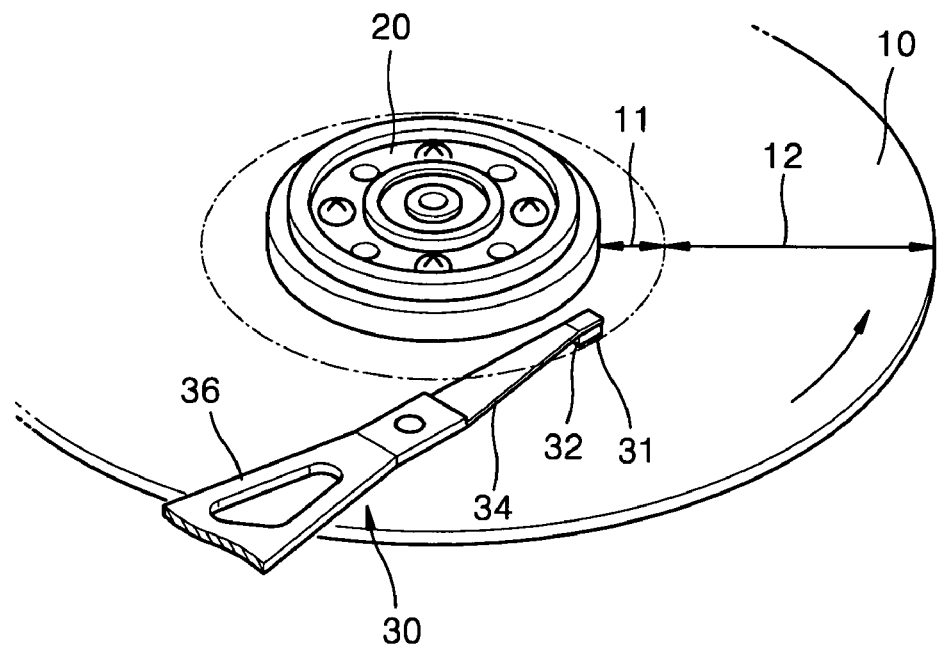
FIG. 1 is a perspective view illustrating part of a typical hard disk drive.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 6A:
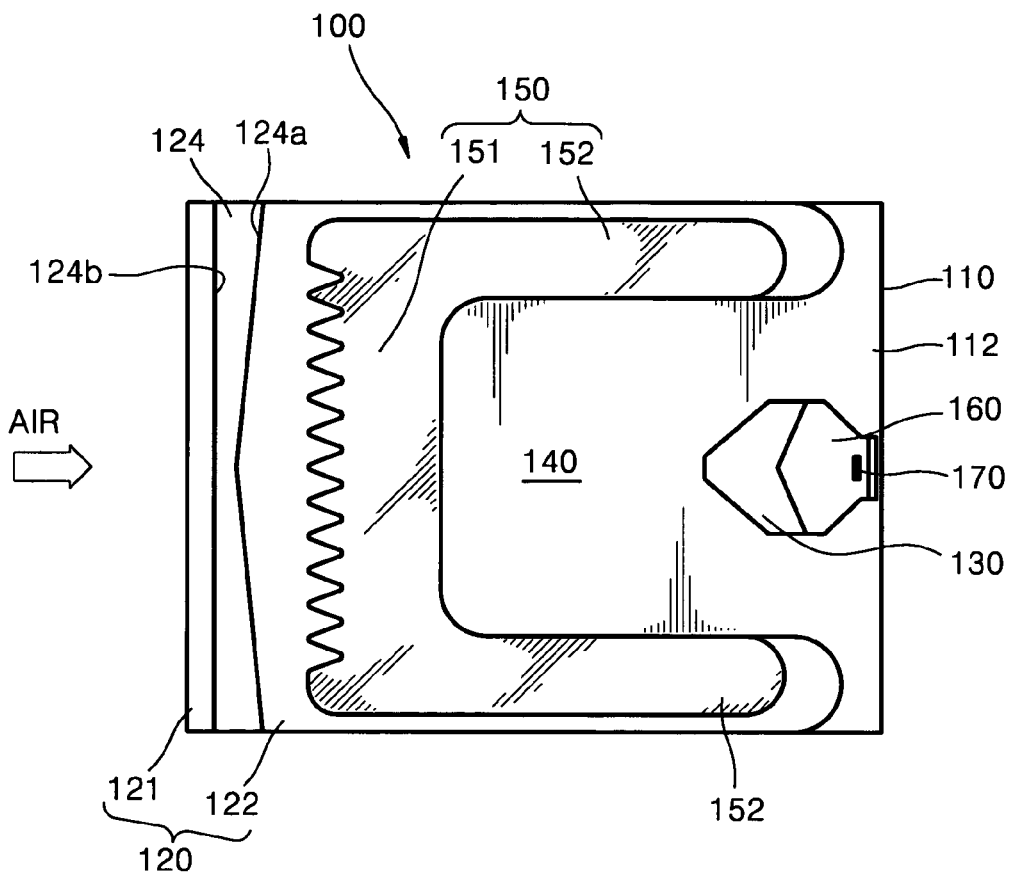
FIGS. 6A and 6B are a plan view and a perspective view, respectively, illustrating an air bearing slider according to an embodiment of the present invention.
Figure 6B:
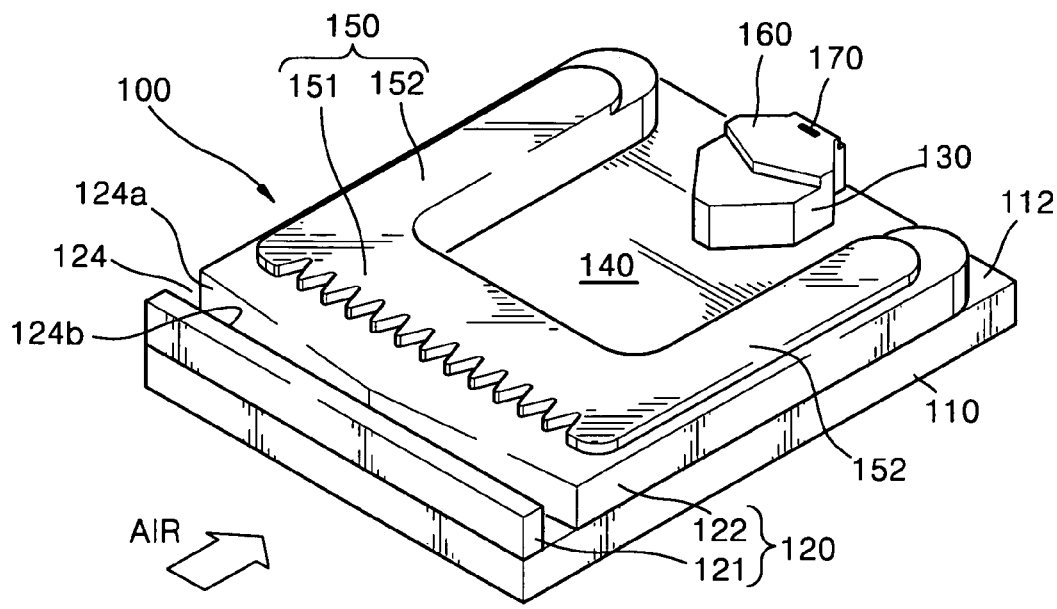

Referring to FIGS. 6A and 6B, an air bearing slider 100 according to an embodiment of the present invention includes a body 110 having a thin block shape. First and second rail bases 120 and 130 and a negative pressure cavity 140 are arranged on a surface 112 of the body 110 facing a disk (not shown).

The first rail base 120 protrudes a predetermined height, for example, 1–1.5 μm, from the surface 112 of the body 110 facing the disk, and has a U shape having one side open to a trailing end portion of the body 110.

A first positive pressure generating rail portion 150 is provided on an upper surface of the first rail base 120. The first positive pressure generating rail portion 150 includes a cross rail 151, separated a predetermined distance from a leading end portion of the first rail base 120 where air enters, and extending in a first direction, that is, a widthwise direction of the first rail base 120, perpendicular to a direction in which air enters, and a pair of side rails 152 extending in a second direction, that is, a lengthwise direction of the first rail base 120, from both ends of the cross rail 151, and parallel to the direction in which air enters. Thus, the first positive pressure generating rail portion 150 has a U shape like the first rail base 120. The first positive pressure generating rail portion 150 protrudes a predetermined height, for example, 0.1–0.2 μm, from the upper surface of the first rail base 120. Accordingly, a step is formed between an upper surface of the first positive pressure generating rail portion 150 and the upper surface of the first rail base 120.

The second rail base 130 is formed adjacent to the trailing end portion of the body 110 to protrude a predetermined height, for example, 1–1.5 μm, from the surface 112 of the body 110 facing the disk. In particular, the height of the second rail base 130 is preferably the same as that of the first rail base 120, though this is not required.

A second positive pressure generating rail portion 160 is provided on an upper surface of the second rail base 130. The second positive pressure generating rail portion 160 protrudes a predetermined height, for example, 0.1–0.2 μm, from the upper surface of the second rail base 130. Accordingly, a step is formed between an upper surface of the second positive pressure generating rail portion 160 and the upper surface of the second rail base 130. The height of the step is preferably the same as that of the step between the first rail base 120 and the first positive pressure generating rail portion 150, though they are not required to be of the same height. A read/write head 170 is mounted on the second positive pressure generating rail portion 160.

Each of the upper surfaces of the first and second positive pressure generating rail portions 150 and 160 functions as an air bearing surface (ABS) to generate a lifting force to lift the slider 100 by generating positive pressure. Moreover, the upper surfaces of the first and second rail bases 120 and 130 are present on the air bearing surface to provide steps thereto. Since a wedge effect acts on the air entering toward the air bearing surface of the slider 100 due to the steps, a sufficient amount of positive pressure can be generated.

The negative pressure cavity 140 is defined by the first rail base 120, and functions to generate negative pressure pulling the slider 100 toward the surface of the disk.

One aspect of the present invention is an air flow channel 124 formed on the first rail base 120 to a predetermined depth from the upper surface thereof. The air flow channel 124 is disposed between the leading end portion of the first rail base 120 and the cross rail 151, and extended in the widthwise direction of the first rail base 120, separated a predetermined distance from the leading end portion of the first rail base 120. The depth of the air flow channel 124 is preferably the same as the height of the first rail base 120, though this is not required. That is, the air flow channel 124 may be formed to have the same depth as the negative pressure cavity 140. Thus, the first rail base 120 is divided by the air flow channel 124 into two portions: a cross bar 121 disposed in front of the air flow channel 124, and a U shaped base 122 disposed at the rear of the air flow channel 124.

Some of the air entering from the leading end portion of the slider 100 and passing over the cross bar 121 proceeds along the air flow channel 124 to flow toward both side portions of the slider 100. The slider 100 is quickly lifted at a low rotation speed of the disk by the flow of air.

A rear inner surface 124a of the air flow channel 124 is preferably inclined from the center portion toward both end portions of the air flow channel 124 in the lengthwise direction thereof, though the inclination is not required. However, a front inner surface 124b of the air flow channel 124 may be a flat surface. Accordingly, the width of the air flow channel 124 gradually increases from the center portion toward both end portions of the air flow channel 124 in the lengthwise direction thereof.

In the air flow channel 124 having the structure discussed above, air can flow well toward both side portions of the slider 100 so that a lifting speed of the slider 100 increases. Also, foreign materials such as debris and dust can be prevented from remaining in the air flow channel 124.

A front end portion of the cross rail 151 may have a saw-toothed shape. The air entering the front end portion of the cross rail 151 is not dispersed to both lateral sides by the saw-toothed shape, and mostly flows over the upper surface of the cross rail 151. Thus, since a greater amount of air flows in over the upper surface of the cross rail 151 to facilitate generation of positive pressure, the slider 100 can be lifted more quickly.

FIGS. 7A, 7B, 8A, and 8B show air bearing sliders according to two other embodiments of the present invention. Since these embodiments have additional constituent elements to those of the above-described embodiment, the following description will briefly cover the added constituent elements.

Figure 7A:
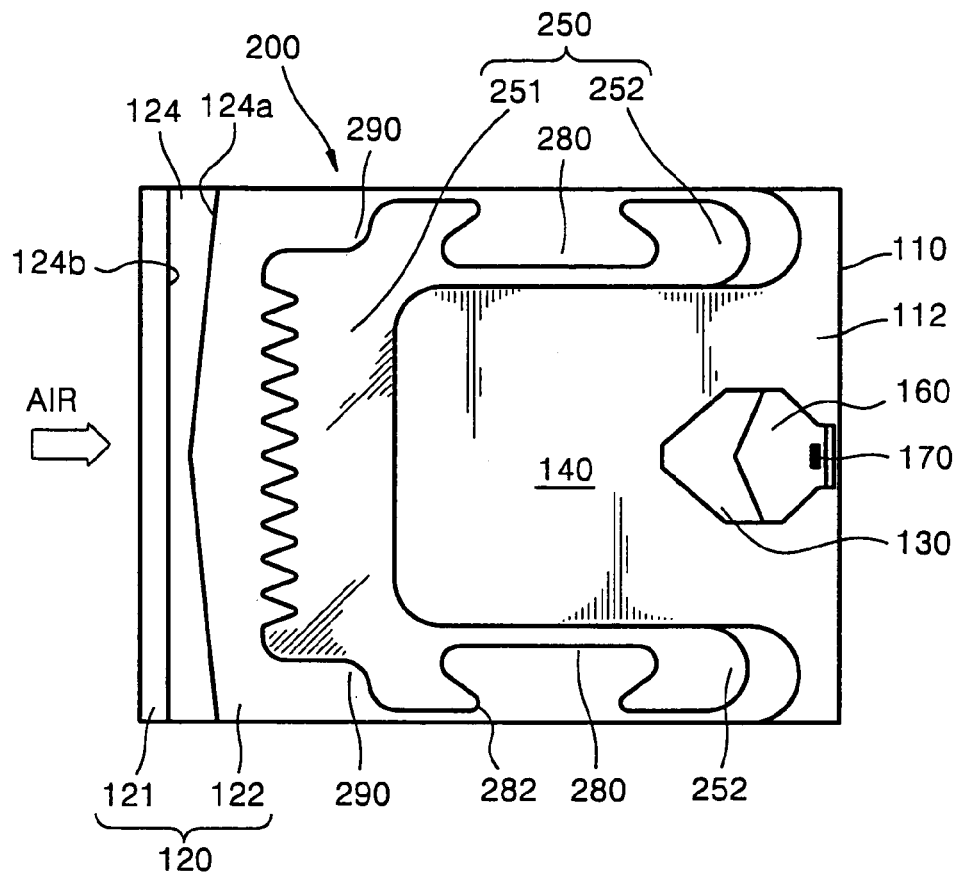
FIGS. 7A and 7B are a plan view and a perspective view, respectively, illustrating an air bearing slider according to another embodiment of the present invention.
Figure 7B:
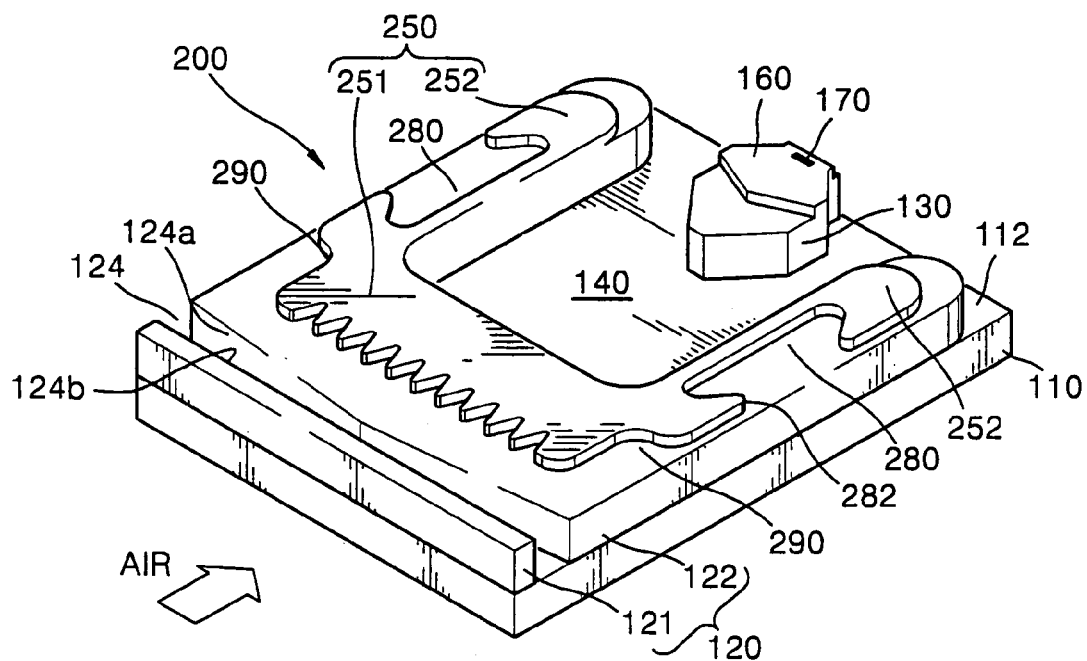

Referring to FIGS. 7A and 7B first, an air bearing slider 200 according to this embodiment of the present invention includes the first and second rail bases 120 and 130 protruding from the surface 112 of the body 110 facing the disk, a first positive pressure generating rail portion 250 including a cross rail 251 and a pair of side rails 252 protruding from the first rail base 120, the second positive pressure generating rail portion 160 protruding from the second rail base 130, on which the head read/write 170 is mounted, the negative pressure cavity 140 defined by the first rail base 120, and the air flow channel 124 formed in the first rail base 120.

The slider 200 further includes a negative pressure generating pocket 280, or space, generating auxiliary negative pressure in each of the side rails 252. The negative pressure generating pocket 280 is formed to have a very shallow depth compared to the depth of the negative pressure cavity 140. Preferably, the bottom surface of the negative pressure generating pocket 280 has the same height as the upper surface of the first rail base 120, though this is not a requirement. The negative pressure generating pocket 280 is separated from the negative pressure cavity 140, and has one side open to the outside of the side rail 252 through an open portion 282. The negative pressure generating pocket 280 is preferably, though not necessarily, formed in the lengthwise direction of the side rails 252 according to the shape of the side rails 252, and the length of the open portion 282 may be shorter than that of the negative pressure generating pocket 280. The negative pressure generating pocket 280 generates an auxiliary negative pressure separated from a main negative pressure generated by the negative pressure cavity 140.

The air bearing slider 200 according to this embodiment of the present invention includes the negative pressure cavity 140 generating the main negative pressure, which is disposed at the central portion of the surface 112 of the body 110 facing the disk, and the negative pressure generating pocket 280 generating the auxiliary negative pressure, which is disposed at both sides of the negative pressure cavity 140. In the slider 200, the negative pressure cavity 140 can include a reduced area compared to the conventional slider. The lowering of the main negative pressure due to the reduction in the area of the negative pressure cavity 140 can be compensated for by the auxiliary negative pressure generated by the negative pressure generating pocket 280.

Also, the slider 200 may further include a first side indent 290 provided at each of the end portions in the lengthwise direction of the cross rail 251, and extending in the direction in which air enters, from the front end portion of the cross rail 251. Preferably, the bottom surface of the first side indent 290 is formed to have the same height as the upper surface of the first rail base 120, though the same height is not required. The first side indent 290 generates higher positive pressure on the upper surface of each of the side rails 252, that is, the air bearing surface, and suppresses negative pressure from being generated by the negative pressure generating pocket 280 when the rotation speed of the disk is low.

According to this embodiment, when the rotation speed of the disk is low, negative pressure is hardly generated by the negative pressure generating pocket 280. Thus, since the negative pressure is lower than the positive pressure acting on the air baring surface, the lifting speed of the slider 200 increases. However, when the rotation speed of the disk is sufficiently increased, since a sufficient amount of negative pressure which balances the positive pressure generated on the air bearing surface is generated in the negative pressure cavity 140 and the negative pressure generating pocket 280, the flying height of the slider 200 according to the rotation speed of the disk can be constantly maintained.

Figure 8A:
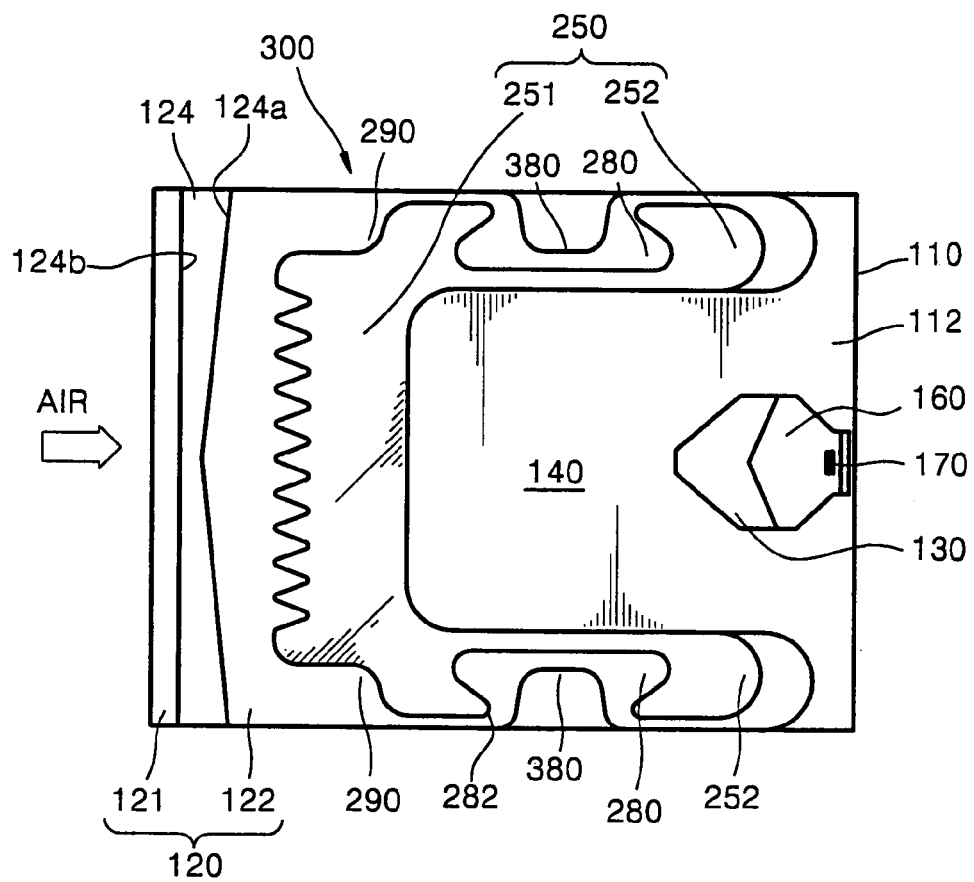
FIGS. 8A and 8B are a plan view and a perspective view, respectively, illustrating an air bearing slider according to yet another embodiment of the present invention.
Figure 8B:
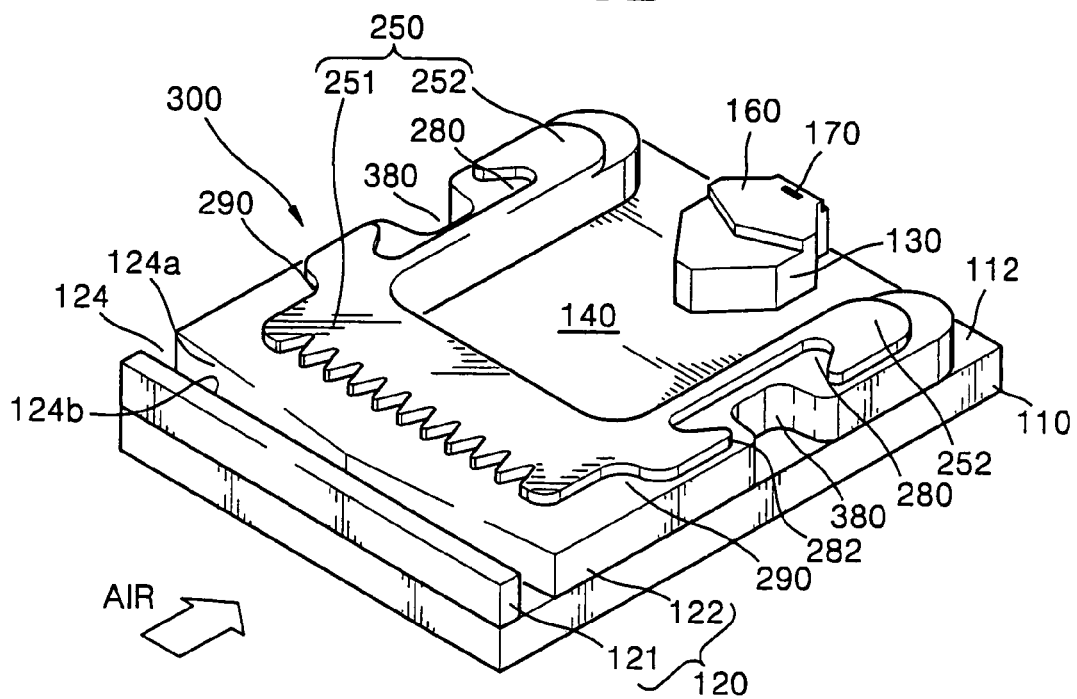

Next, referring to FIGS. 8A and 8B, an air bearing slider 300 according to yet another embodiment of the present invention includes all the constituent elements of the embodiment shown in FIGS. 7A–7B. The slider 300 further includes a second side indent 380 formed at each of both side portions of the first rail base 120, and open to the outside of the first rail base 120. The second side indent 380 is preferably formed along the entire height of the first rail base 120, though this is not required. Also, the upper end portion of the second side indent 380 may be disposed inside the negative pressure generating pocket 280. However, the second side indent 380 can be formed without the negative pressure generating pocket 280.

The second side indent 380 according to this embodiment of the present invention has a similar function to the negative pressure generating pocket 280. That is, an excessive amount of negative pressure at a low rotation speed is prevented from being generated by the second side indent 380, which is open to the outside of the first rail base 120. Accordingly, the lifting speed of the slider 300 increases. However, when the rotation speed of the disk is sufficiently increased, the negative pressure generated in the second side indent 380 increases. Thus, the negative pressure is balanced with respect to the positive pressure generated on the air bearing surface, so that the flying height of the slider 300 according to the rotation speed of the disk can be constantly maintained.

Figure 2:
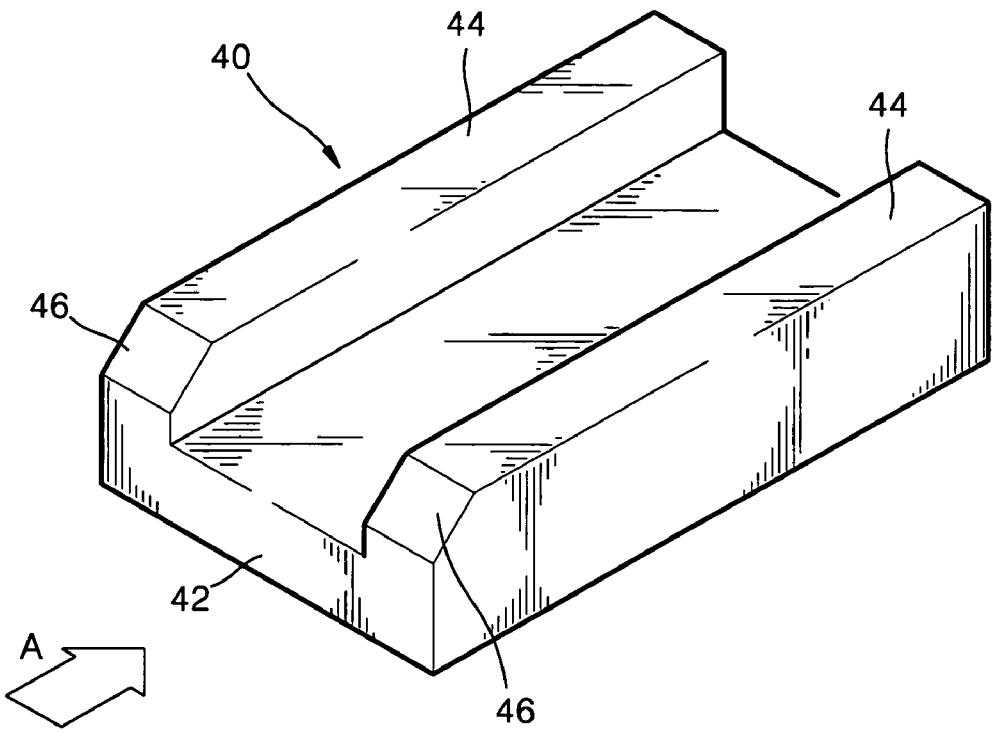
FIG. 2 is a perspective view illustrating a basic structure of a conventional TF type air bearing slider.
Figure 3:
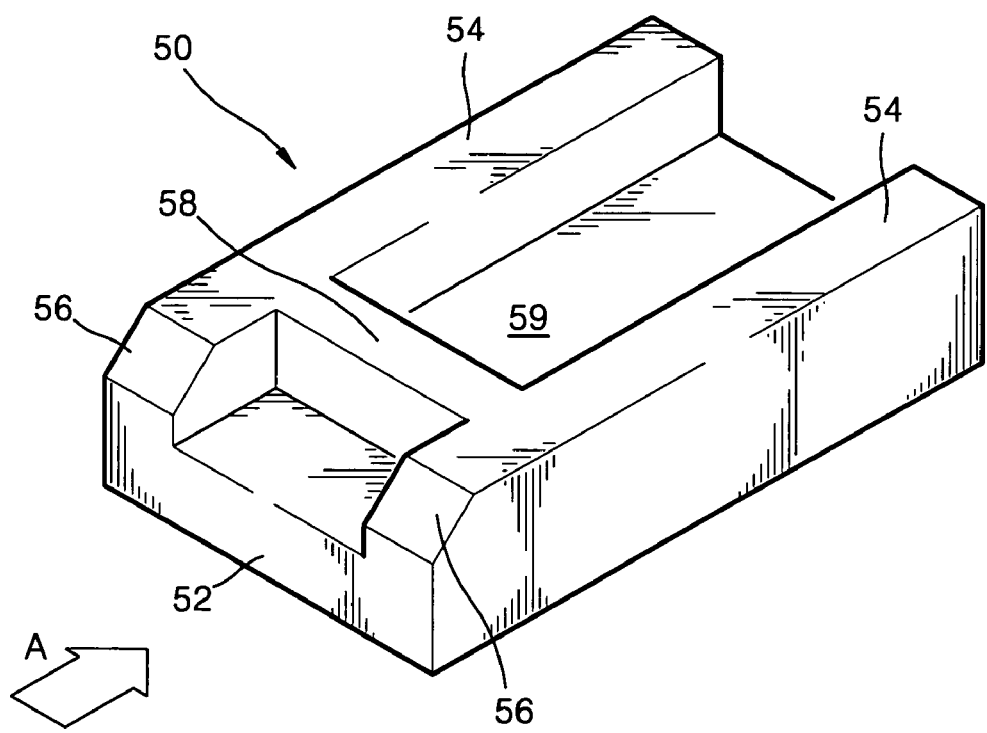
FIG. 3 is a perspective view illustrating a basic structure of a conventional NP type air bearing slider.
Figure 4:
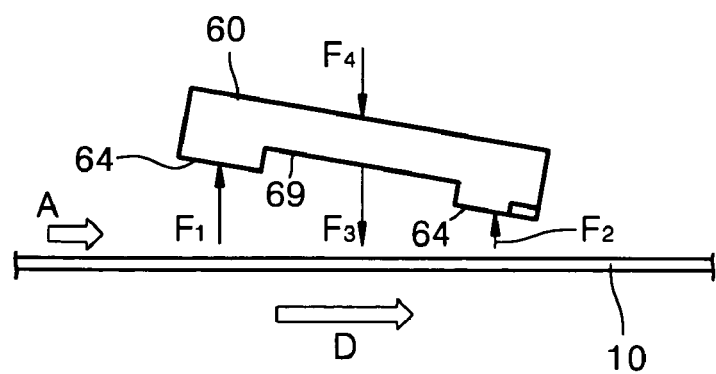
FIG. 4 is a view for explaining forces acting on the NP type air bearing slider during rotation of a disk.
Figure 5A:
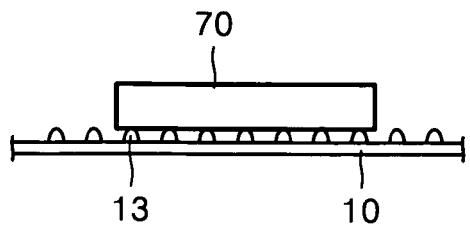
FIGS. 5A through 5D are views illustrating the procedure of taking-off of the air bearing slider.
Figure 5B:
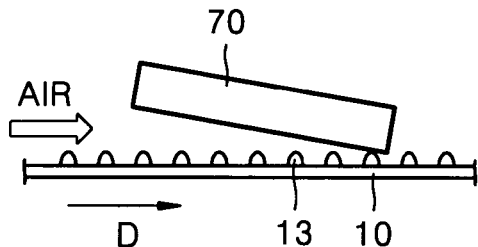
Figure 5C:
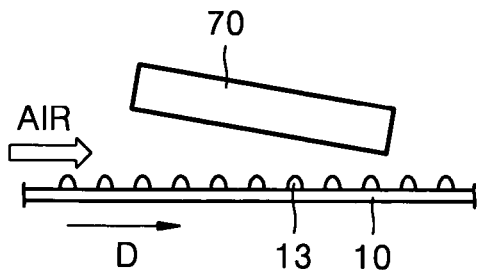
Figure 5D:
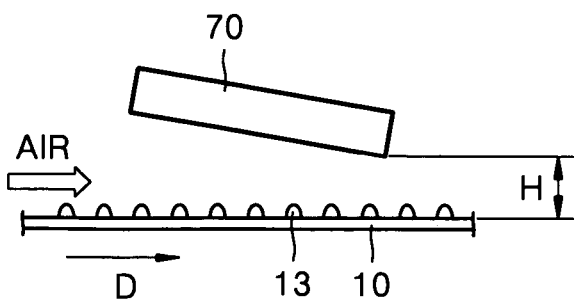
Figure 9:
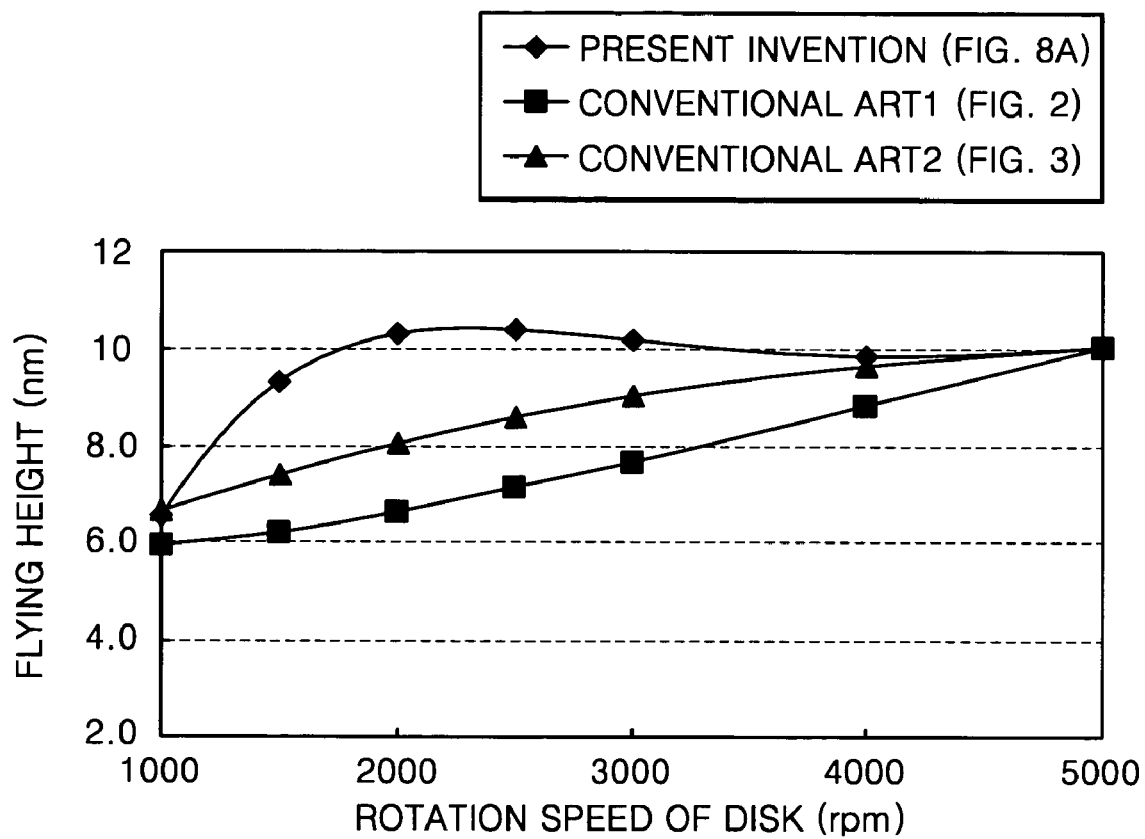
FIG. 9 is a graph showing the comparison of a taking-off characteristic between the sliders according to the present invention and the conventional art.

FIG. 9 is a graph showing the comparison of a taking-off characteristic between the sliders according to the present invention and the conventional art. The graph shows changes in the flying height of the slider according to the embodiment of the present invention shown in FIGS. 8A–8B, the conventional TF type slider shown in FIG. 2, and the conventional NP type slider shown in FIG. 3, according to the rotation speed of the disk. The flying heights of all three sliders are set to 10 nm at a regular rpm of a disk.

Referring to FIG. 9, in the conventional TF type slider, a flying height thereof is not more than 7 nm at a rotation speed of 2,000 rpm and a flying height of about 10 nm is obtained when the rotation speed reaches 5,000 rpm. For the conventional NP type slider, which exhibits a better taking-off performance than the conventional TF type slider, a flying height thereof is 8 nm at a rotation speed of 2,000 rpm and a flying height of about 10 nm is obtained when the rotation speed reaches 4,000 rpm. However, the slider according to the present invention shows a flying height of about 10 nm at a rotation speed of 2,000 rpm. Also, it can be seen that, even when the rotation speed of the disk increases, the flying height is hardly changed.

As described above, since the air bearing slider of a disk drive according to the present invention can be quickly lifted at a low rotation speed of a disk, damage to the head, due to friction between the slider and the disk, and generation of debris can be prevented. After the slider is lifted, the change in the flying height of the slider according to a change in the rotation speed of the disk is minimized. Thus, the taking-off characteristic of the slider is improved, shortening of the life span of the head due to friction is prevented, and reliability in the operation of a disk drive is improved.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An air bearing slider of a disk drive to move a read/write head to a desired position on a disk by being lifted from a surface of the disk, the air bearing slider comprising:
   a body having a surface facing the disk;
   a first rail base protruding from the surface facing the disk, wherein the first rail base has a U shape open to a trailing end portion of the body;
   a first rail portion protruding from the first rail base to generate positive pressure, the first rail portion comprising:
      a cross rail separated from a leading end portion of the first rail base and extending perpendicular to a direction in which air enters, and
      a pair of side rails respectively extending from both ends of the cross rail parallel to the direction in which air enters;
   a negative pressure cavity defined by the first rail base;
   a second rail base protruding from the surface facing the disk, adjacent to the trailing end portion of the body;
   a second rail portion protruding from the second rail base to generate positive pressure; and an air flow channel disposed between the leading end portion of the first rail base and the cross rail, formed to a predetermined depth from an upper surface of the first rail base, and extending perpendicular to the direction in which air enters.

2. The air bearing slider as claimed in claim 1, wherein a rear inner surface of the air flow channel is inclined from a center portion toward both end portions of the air flow channel.

3. The air bearing slider as claimed in claim 1, wherein the depth of the air flow channel is the same as the height of the first rail base.

4. The air bearing slider as claimed in claim 1, wherein a front end portion of the cross rail has a saw-toothed shape.

5. The air bearing slider as claimed in claim 1, further comprising spaces respectively formed in each of the side rails to generate negative pressure, wherein the spaces are shallower than the negative pressure cavity, separated from the negative pressure cavity, and open to the outside of the respective side rails.

6. The air bearing slider as claimed in claim 5, wherein a bottom surface of each of the spaces is formed at the same height as the upper surface of the first rail base.

7. The air bearing slider as claimed in claim 5, wherein the spaces are formed in a lengthwise direction of the side rails.

8. The air bearing slider as claimed in claim 5, wherein the spaces are open to the outside of the respective side rails through an open portion of the side rails, and the length of the open portion is shorter than the length of the respective spaces.

9. The air bearing slider as claimed in claim 1, further comprising first side indents respectively provided at each of both end portions of the cross rail in a lengthwise direction and extending from the front end portion of the cross rail parallel to the direction in which air enters.

10. The air bearing slider as claimed in claim 9, wherein a bottom surface of each of the first side indents is at the same height as the upper surface of the first rail base.

11. The air bearing slider as claimed in claim 9, further comprising second side indents respectively formed at each of both side portions of the first rail base and open to the outside of the first rail base.

12. The air bearing slider as claimed in claim 11, wherein the second side indents are formed along the entire height of the first rail base.

13. The air bearing slider as claimed in claim 11, further comprising spaces respectively formed in each of the side rails to generate a negative pressure, wherein the spaces are shallower than the negative pressure cavity, separated from the negative pressure cavity, and open to the outside of the respective side rails, and wherein an upper end portion of the second side indents are disposed in the respective spaces.

14. The air bearing slider as claimed in claim 1, wherein the first rail base and the second rail base are formed to have the same height.

15. The air bearing slider as claimed in claim 14, wherein a step between the first rail base and the first rail portion and a step between the second rail base and the second rail portion have the same height.

16. The air bearing slider as claimed in claim 1, further comprising side indents respectively formed at each of both side portions of the first rail base and open to the outside of the first rail base.

17. The air bearing slider as claimed in claim 16, wherein the side indents are formed along the entire height of the first rail base.

18. The air bearing slider as claimed in claim 1, wherein the read/write head is provided on the second rail portion.

19. The air bearing slider as claimed in claim 2, wherein a front inner surface of the air flow channel is a flat surface.

20. An air bearing slider of a disk drive, the air bearing slider comprising:
    a body having a surface facing a disk;
    a rail base protruding from the surface facing the disk; and
    a rail portion protruding from the rail base;
    wherein a front end portion of the rail portion has a saw toothed shape.

21. An air bearing slider of a disk drive, the air bearing slider comprising:
    a body having a surface facing a disk;
    a rail base protruding from the surface facing the disk;
    a rail portion protruding from the rail base; and
    an air flow channel disposed between a leading end portion of the rail base and the rail portions,
    wherein the air flow channel is formed to a predetermined depth from an upper surface of the rail base, and extending perpendicular to a direction in which air enters, and
    wherein a rear inner surface of the air flow channel is inclined from a center portion toward both end portions of the air flow channel, such that the rear inner surface of the air flow channel is inclined in a direction toward the leading end portion of the rail base to lift the air bearing slider.

* * * * *

UNITED STATES PATENT AND TRADEMARK OFFICE
CERTIFICATE OF CORRECTION

| | |
|---|---|
| PATENT NO. | : 7,099,114 B2 |
| APPLICATION NO. | : 10/753348 |
| DATED | : August 29, 2006 |
| INVENTOR(S) | : Tae-Sik Kang |

It is certified that error appears in the above-identified patent and that said Letters Patent is hereby corrected as shown below:

Column 10, Line 36, change "portions," to --portion,--.

Signed and Sealed this

Sixth Day of February, 2007

JON W. DUDAS
*Director of the United States Patent and Trademark Office*